Patented Nov. 25, 1930

1,782,713

UNITED STATES PATENT OFFICE

HARRY O. CHUTE, OF NEW YORK, N. Y.

VULCANIZATION OF RUBBER

No Drawing. Original application filed December 21, 1922, Serial No. 608,355. Divided and this application filed May 29, 1926. Serial No. 112,693.

This invention relates to the vulcanization of rubber; and it comprises a method of vulcanizing rubber with sulfur wherein such vulcanization is performed in the presence of a material resulting from the co-condensation of a cyanamid, an aldehyde and an amine; all as more fully hereinafter set forth and as claimed.

In the vulcanization of rubber with elemental sulfur or its equivalents, such as selenium, etc., by heating the rubber-sulfur mixture above the melting point of sulfur, it has always been known that such metallic bases as zinc oxid, lead oxid, lime and magnesia (and some others) were accelerators of vulcanization and such bases were customarily added to nearly all stocks before vulcanization.

About the time of the advent of plantation rubber, many nitrogenous basic organic compounds, such as amines and their derivatives, were found to be accelerators and their use is now common.

I have found that vulcanization can be materially accelerated with certain organic bodies belonging to quite other classes: those resulting from the co-condensation of a cyanamid, an aldehyde and an amine.

Calcium cyanamid or "lime nitrogen" occurs in commerce, being marketed mostly as a fertilizer, but is not particularly useful for the present purposes as it is only sluggishly reactive, a fact which is probably due to the high temperature at which the commercial material is made. But many active accelerators containing the cyanamid group can be made with the aid of this commercial "lime nitrogen" as a raw material, by separating the lime in well known ways, such as treatment with water, weak acids, such as carbonic acid, or dilute sulfuric acid, etc.

It is well known that cyanamid on standing or heating polymerizes to dicyandiamid and other polymerized compounds. The dicyandiamid can readily be produced in crystallized form as a white permanent crystal preparation.

The cyanamid compounds may be advantageously joined with various of the ordinary organic accelerators, such as thiocarbanilid, toluidines, dimethylamine, piperidine, and anilin. The combination of orthotoluidine and dicyandiamid makes an especially valuable vulcanization accelerator. In making this accelerator and others of its class, dicyandiamid is dissolved in a minimum quantity of water and the orthotoluidine, or other amine such as anilin or dimethylamine, is added with the addition of enough hydrochloric or other acid to promote mutual solution while heated. On cooling, crystals separate out which, when dried and ground, are used as the accelerator. In my application Serial No. 608,355 which matured into Patent No. 1,593,017, I have claimed processes of vulcanizing rubber in which these compounds are used as accelerating agents.

I further disclosed in my above mentioned application that the aldehyde condensation products of the amines in the presence of a cyanamid compound are suitable for use as rubber accelerators; that is the reaction products formed by condensing together aldehyde, cyanamid and an amine. The present application is a division of my said copending application Serial No. 608,355, filed Dec. 21, 1922, which matured into Patent No. 1,593,017, and it relates to processes of vulcanizing rubber disclosed but not claimed in the said copending application, namely, processes of vulcanizing rubber in the presence of the reaction products formed by condensing together aldehyde, cyanamid and amine, of which the above mentioned amines are typical. I have found that if, instead of merely reacting together an amine and a cyanamid as claimed in my acknowledged prior application, there is added a third reactant, namely, aldehyde, the reaction products are of a different nature but they also possess the property of functioning as rubber accelerators. The reaction products of aldehyde - cyanamid amine condensation, whatever they may be, are all useful in processes of vulcanizing rubber. The exact conditions of condensation may be varied over a wide range and various amines and aldehydes may be used. But so long as the three specified reactants are condensed together the products are useful in these rubber processes. The accelerating action of many of these compounds is quite marked. They are particularly valuable because they are either crystalline or resinous substances and for this reason they are more readily incorporated into the rubber mix.

As an example anilin, cyanamid and formaldehyde solutions may be mixed in aqueous, alcoholic or acid solution and the solid condensation products separated, purified and ground for use as an accelerator.

In vulcanizing rubber by the aid of the above accelerators, it is well to break down the raw rubber on heated rolls and if, for example, a tire tread is to be made about equal quantities of rubber and pigments, such as zinc oxid, gas black, etc., are mixed with sulfur, the amount of sulfur being from 4 to 6 per cent of the rubber. The pigments are incorporated in the rubber by continuous mixing on the rolls which may be quite warm without danger of scorching. When the pigments and other materials are thoroughly incorporated, the mass is taken from the rolls and used as a "mother batch" when it has cooled or preferably stood for several days. Then to 100 parts of mother batch, which is re-plasticized on cooler rolls, 1 part of the above accelerators is added; and if vulcanized at 45 pounds steam pressure for 1 hour, a good product is obtained. The quantity of the accelerator may vary according to the hardness of cure desired, the slowness of normal vulcanization of rubber compound under treatment, the heat used and other factors known to the expert.

The aldehyde-amine-cyanamid condensation products above described and claimed in the appended claims have advantageous uses in the vulcanization of rubber under conditions where it is desirable to incorporate the accelerator in the form of a solid or semi-solid material in the rubber mix.

This application is a division of an application of Harry O. Chute, Serial No. 608,355, filed December 21, 1922, which matured into Patent No. 1,593,017 on July 20, 1926.

What I claim is:—

1. In the vulcanization of rubber the process which comprises vulcanizing such rubber in the presence of the reaction product of a cyanamid, formaldehyde and an amine.

2. In the vulcanization of rubber the process which comprises vulcanizing such rubber in the presence of the reaction product of anilin, cyanamid and formaldehyde.

3. In the vulcanization of rubber the process which comprises vulcanizing such rubber in the presence of the reaction product of a cyanamid, formaldehyde and a primary amine.

4. In the vulcanization of rubber the process which comprises vulcanizing such rubber in the presence of the reaction product of a cyanamid product, formaldehyde and a primary aryl amine.

5. In the vulcanization of rubber the process which comprises vulcanizing such rubber in the presence of the reaction product of a cyanamid product, formaldehyde and a primary monocyclic aryl amine.

6. In the vulcanization of rubber the process which comprises vulcanizing such rubber in the presence of the reaction product of a cyanamid, a formaldehyde and a primary amine.

7. In the vulcanization of rubber the process which comprises vulcanizing such rubber in the presence of the reaction product of a cyanamid, a formaldehyde and a primary aryl amine.

8. In the vulcanization of rubber the process which comprises vulcanizing such rubber in the presence of the reaction product of a cyanamid, a formaldehyde and a primary monocyclic aryl amine.

9. In the vulcanization of rubber the process which comprises vulcanizing such rubber in the presence of the reaction product of a cyanamid, formaldehyde and an amine selected from a group consisting of thiocarbanilid, toluidine, dimethylamine, piperidine and aniline.

10. In the vulcanization of rubber the process which comprises vulcanizing such rubber in the presence of the reaction product of a cyanamid, formaldehyde and a phenyl amine.

11. In the vulcanization of rubber the process which comprises vulcanizing such rubber in the presence of the reaction product of a cyanamid, formaldehyde and a phenyl amine selected from a group consisting of thiocarbanilid, toluidine and aniline.

In testimony whereof, I have hereunto affixed my signature.

HARRY O. CHUTE.